United States Patent [19]

Weiland, Sr.

[11] 4,019,706
[45] Apr. 26, 1977

[54] PIPE HANGER

[75] Inventor: George N. Weiland, Sr., Mundelein, Ill.

[73] Assignee: Imoco-Gateway Corporation, Chicago, Ill.

[22] Filed: Mar. 8, 1976

[21] Appl. No.: 664,705

[52] U.S. Cl. .................................. 248/62; 248/58
[51] Int. Cl.$^2$ ........................................ E21F 17/02
[58] Field of Search ................ 248/62, 58, 59, 63, 248/74; 403/161, 164, 376, 378

[56] References Cited

UNITED STATES PATENTS

| | | | |
|---|---|---|---|
| 3,044,739 | 7/1962 | Attwood | 248/58 |
| 3,185,758 | 5/1965 | Litz | 248/62 |
| 3,415,474 | 12/1968 | Kindorf | 248/62 |
| 3,652,045 | 3/1972 | Hirt | 248/62 |

Primary Examiner—Robert A. Hafer
Attorney, Agent, or Firm—Kinzer, Plyer, Dorn & McEachran

[57] ABSTRACT

A pipe hanger including a U-shaped yoke and a U-shaped saddle, each having apertures through the ends of the arms with the apertures being alignable by assembly of the saddle arms on the yoke arms in partial overlapping arrangement. A mounting rod inserted through the apertures joins the yoke and saddle together; the mounting rod has a uniform diameter and bent ends of unequal length each disposed at an angle of about 90° to the axis of the rod. The dimensions of the apertures and rod ends are so related that upon insertion of the rod through the apertures, the weight of the saddle maintains the pipe hanger in assembled condition and precludes withdrawal of the mounting rod.

3 Claims, 3 Drawing Figures

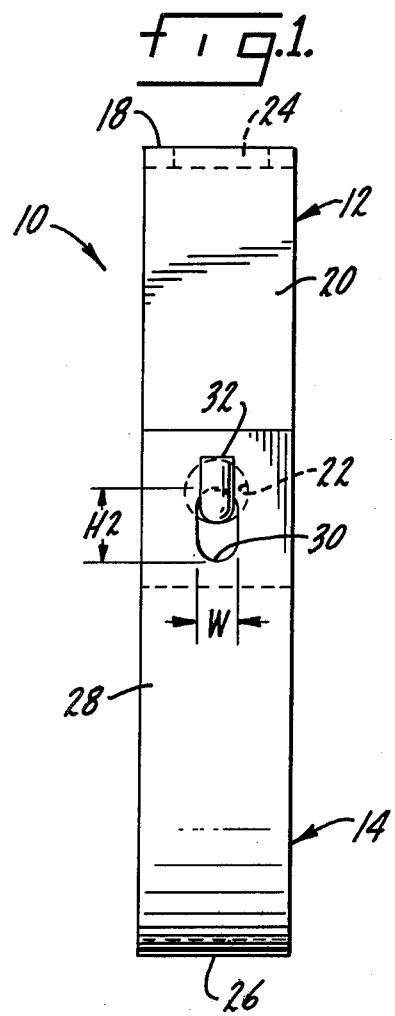
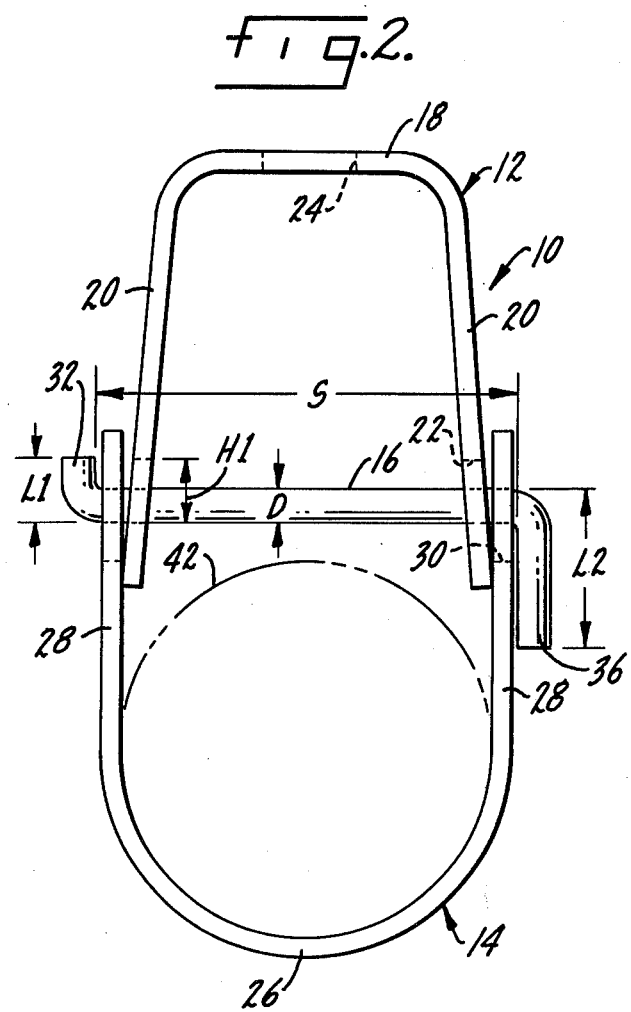
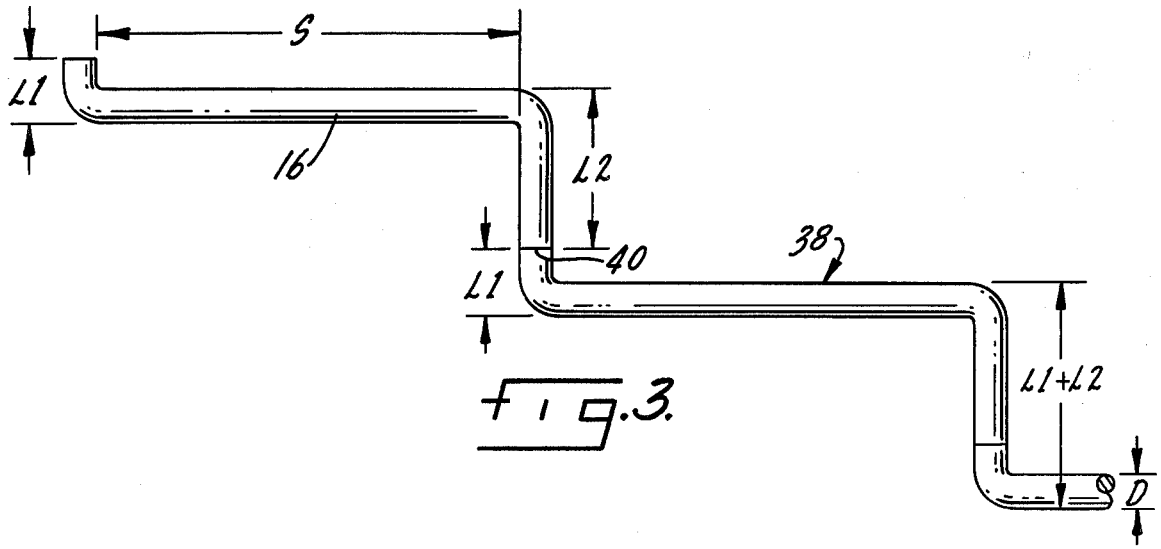

PIPE HANGER

BACKGROUND OF THE INVENTION

This invention relates in general to pipe hangers and more particularly to a yoke and saddle pipe hanger with improved means for joining the saddle and yoke together.

In conventional pipe hangers of the yoke and saddle type, the yoke and saddle arms have alignable holes through which a bolt is inserted to fasten the yoke and saddle together. Several problems attend the use of such bolted pipe hangers, a particularly annoying one being that the nut for the bolt can easily be dropped or lost, often resulting in considerable lost time searching for the nut or a replacement nut. Regardless of such accidents, application of the nut onto the bolt is a somewhat time-consuming operation which necessitates the use of wrenches or other tools. The expense of fabricating the nuts and bolts for such devices is taken for granted.

Boltless-type yoke and saddle pipe hangers have been devised, such as that shown in U.S. Pat. No. 3,652,045 issued Mar. 28, 1972. The hanger shown in this patent employs precision cut keyhole-shaped openings through the arms of the yoke and saddle members and a connecting rod having projections formed thereon which are intricately keyed to the keyhole-shaped apertures. The formation of the slots of the keyhole aperture and the projections on the rod both necessitate manufacturing operations which add to the overall expense of the device. Assembly of the device requires that the apertures of the yoke and saddle members be precisely aligned and that the rod be rotated 180° upon insertion to lock the yoke and saddle together.

SUMMARY OF THE INVENTION

The problems set forth above are solved by the present invention, which provides a boltless yoke and saddle pipe hanger which is both cheaper to manufacture and easier to assemble than previously known devices.

Accordingly, an important object of the present invention is to provide a pipe hanger which includes generally U-shaped yoke and saddle members fastened together in overlapping relationship by a simple mounting rod of uniform diameter having bent end portions of unequal lengths.

Another important object of the present invention is to provide a pipe hanger of the yoke and saddle type in which the mounting rod is insertable through the overlapped arms of the yoke and saddle members at the same angular orientation as is adopted for locking the yoke and saddle together in their assembled positions.

Another object of the invention is to provide a pipe hanger in which the yoke and saddle members are formed by simply punching and bending straps of metal, using inexpensive tools and dies, and the mounting rod is formed merely by bending and cutting an ordinary rod of the desired diameter.

Accordingly, the invention relates to a pipe hanger comprising an inverted generally U-shaped yoke including a bight portion and two yoke arms, each yoke arm having an aperture therein and further including mounting means for mounting the yoke on a support with the bight portion of the yoke substantially horizontal and the yoke arms extending downwardly therefrom. The pipe hanger further comprises a substantially U-shaped saddle having a generally semicircular bight portion and two saddle arms; the saddle arms are assembled on the yoke arms in partial overlapping arrangement, each saddle arm having an aperture at least partially aligned with the aperture in the adjacent yoke arm. A mounting rod of substantially uniform diameter D extends through the apertures in both yoke arms and both saddle arms to join the saddle to the yoke, the mounting rod having one end of length L1 bent at an angle of about 90° to the axis of the rod and the opposite end of a greater length L2 bent at an angle of about 90° to the axis of the rod, the two rod ends being separated by a distance S only slightly larger than the distance across the assembled yoke and saddle. The apertures in the innermost arms of the yoke-saddle assembly are formed with a vertical dimension slightly larger than L1 but smaller than L2, and the apertures in the outermost arms of the yoke-saddle assembly are formed with a vertical dimension slightly larger than L1 but smaller than L2 and a horizontal dimension slightly larger than D but smaller than L1, whereby the weight of the saddle maintains the pipe hanger in assembled condition and precludes withdrawal of the mounting rod.

BRIEF DESCRIPTION OF THE DRAWINGS

FIG. 1 is a front elevation view of a pipe hanger constructed in accordance with one embodiment of the invention;

FIG. 2 is a side elevation view of the pipe hanger of FIG. 1; and

FIG. 3 illustrates a deformed rod from which completed mounting rods for the pipe hanger may be sheared.

DESCRIPTION OF THE PREFERRED EMBODIMENT

A pipe hanger 10, constructed in accordance with one embodiment of the invention, is illustrated in FIGS. 1 and 2. Hanger 10 includes a yoke 12, a saddle 14, and a mounting rod 16. Yoke 12 is a generally U-shaped member having a bight portion 18 and two yoke arms 20. It is preferred that bight 18 be generally flat and that the yoke arms 20 are integral therewith and exend downwardly therefrom in slightly diverging relationship. Since the opposite sides of yoke 12 are similarly constructed, corresponding reference characters are used to identify similar parts of each. The same is true of saddle 14.

An aperture 22 is formed in each yoke arm 20, holes 22 being equi-distant from the bight 18 and transversely centered in the yoke arms 20 as indicated in FIG. 2. A mounting hole 24 is formed through the bight 18 to afford a means for mounting the yoke on a support (not shown) with the bight portion 18 substantially horizontal and the yoke arms 20 extending downwardly. Typically, the bight 18 is mounted on a support by means of a bolt protruding through mounting hole 24. Other types of mounting means may be employed to suspend yoke 12 in the position indicated in FIG. 1.

Saddle 14 is a substantially U-shaped member, with a generally semi-circular bight portion 26 and two integral saddle arms 28 extending tangentially from the ends of the saddle bight 26. The saddle arms 28 each have an aperture 30 formed therethrough. The saddle arms 28 are assembled onto the yoke arms 20 in partial overlapping arrangement as shown in FIG. 1. The aperture 30 through each saddle arm 28 is at least partially aligned with the aperture 22 through the adjacent yoke arm 20. Although the yoke arms 20 are shown within and between the saddle arms 28 in the embodiment of FIG. 1, the arrangement may be reversed, with the saddle arms within the yoke arms.

Mounting rod 16 is of substantially uniform diameter D. In its installed position in the yoke and saddle assembly, as shown in FIGS. 1 and 2, mounting rod 16 extends through the apertures in both yoke arms 20 and both saddle arms 28, joining the saddle to the yoke. Both ends of mounting rod 16 are bent at an angle of about 90° to the axis of the rod, but they are of unequal lengths. The shorter end 32 has a length L1. The longer rod end 36 has a greater length L2. The rod ends are separated by a distance S which is only slightly larger than the distance across the assembled yoke and saddle.

A particular relationship exists between the dimensions of the apertures of the yoke and saddle assembly in the lengths of the ends of the mounting rod. More specifically, the apertures in the innermost arms of the yoke-saddle assembly (here, apertures 22 in yoke arms 20) have a vertical dimension H1 slightly larger than L1 but smaller than L2. These apertures are preferably of circular configuration (see FIG. 2). The apertures in the outermost arms of the yoke-saddle assembly (apertures 30 in saddle arms 28) also have a vertical dimension H2 slightly larger than L1 but smaller than L2, but the horizontal dimension W of these apertures is slightly larger than D but smaller than L1. The term "slightly larger than" is intended to indicate an aperture dimension sufficiently large to easily pass a member to which the reference dimension applies. Similarly, "smaller than" is intended to indicate a dimension sufficiently small to prevent passage of a member to which the reference dimension applies. Thus, the apertures 22 in the innermost arms 20 allow the end 32 of mounting rod 16 to be passed through them, at least when the rod end 32 is oriented in a vertical direction. Likewise, the apertures 30 in the outermost arms 28 permit passage of rod end 32, but only when rod end 32 is vertically oriented. Further, neither set of apertures will pass the longer rod end 36.

Fabrication of the pipe hanger 10 may be accomplished very economically and is particularly adaptable for mass production. Both the yoke 12 and saddle 14 may be formed from metal straps, punched, sheared and bent with simple tooling. The mounting rod 16 can be easily cut from a continuous length of rod stock 38 having a diameter D by bending the rod into a stopped configuration having alternate sets of legs of lengths S and L1+L2, as indicated in FIG. 3. Hence, a single shearing of the rod 38 as at 40 completes the fabrication of each finished mounting rod.

In order to assemble the pipe hanger shown in the drawing, yoke 12 is secured to a support by a bolt or other such fastener engaged in the mounting hole 24, with the bight 18 substantially horizontal and the yoke arms 20 extending downwardly therefrom. The saddle 14 may then be engaged about the underside of a pipe 42 of approximate size. Saddle 14 and the pipe are then positioned, relative to the yoke 12, with the yoke and saddle arms in overlapping alignment and the apertures 22 and 30 generally aligned. End 32 of the mounting rod 16 is then passed through the apertures 22 and 30 to a position where end 36 abuts one of the saddle arms 28 (FIG. 1). When released, the weight of the saddle and pipe will effectively hold the saddle 14 down in the position indicated in FIGS. 1 and 2, showing the assembled condition of the pipe hanger 10. Withdrawal of mounting rod 16 from the assembly is precluded, unless saddle 28 and pipe 42 are raised, by abutment of rod ends 32 and 36 against the adjacent saddle arms 28.

Alternatively, pipe hanger 10 may be mounted on a support, as described above, with no pipe present. The weight of saddle 28 is sufficient to maintain the pipe hanger in assembled condition. When used in this manner, pipe 42 is inserted axially into the pipe hanger.

Disassembly of hanger 10 is readily and quickly accomplished merely by raising saddle 28 (and pipe 42 if present) enough to effect vertical alignment of apertures 22 and 30, then withdrawing rod 16. Rod end 32 need not be perfectly aligned with the apertures 32 in the outermost arms 28 for either insertion or removal, since its rounded peripheral surface helps guide it through the apertures. The mounting rod 16 need not be disposed horizontally for insertion of end 32 through the first pair of apertures, but rather may be oriented in whatever direction is most comfortable for the installer. For example, mounting rod 16 may be almost vertically oriented when inserting end 32 into the first set of apertures. In addition, because of the circular shape of the apertures in yoke arms 20, parallel alignment of the yoke arms and the saddle arms is not critical in assembly or disassembly of the pipe hanger 10. Further, the mounting rod 16 may be inserted or removed with rod end 36 oriented either upwardly or downwardly, although it is preferred that it be directed downwardly since gravity may be advantageously utilized to maintain it in this position.

The present invention, therefore, affords a pipe hanger which may be inexpensively manufactured and quickly and easily assembled. Some tolerance is permitted in the positioning of the various parts for assembly which may therefore be accomplished expeditiously and with little or no requirement for manual dexterity.

I claim:

1. A pipe hanger comprising:
   an inverted generally U-shaped yoke including a bight portion and two yoke arms, each yoke arm having an aperture therein, the two yoke arm apertures being of uniform size and having top and bottom edges each forming a continuous curve;
   mounting means for mounting the yoke on a support with the bight portion of the yoke substantially horizontal and the yoke arms extending downwardly therefrom;
   a substantially U-shaped saddle having a generally semicircular bight portion and two saddle arms, the saddle arms being assembled on the yoke arms in partial overlapping arrangement, each saddle arm having an aperture at least partially aligned with the aperture in the adjacent yoke arm, the two saddle arm apertures being of uniform size and having top and bottom edges each forming a continuous curve;
   and a mounting rod of substantially uniform diameter D and consistent cross-sectional configuration throughout its length, extending through the apertures in both yoke arms and both saddle arms to join the saddle to the yoke, the mounting rod having a first end of length L1 bent at an angle of about 90° to the axis of the rod and the opposite end of a greater length L2 bent at an angle of about 90° to the axis of the rod, the two rod ends being separated by a distance S only slightly larger than the distance across the assembled yoke and saddle;

the apertures in the innermost arms of the yoke-saddle assembly having a vertical dimension slightly larger than L1 but smaller than L2;

and the apertures in the outermost arms of the yoke-saddle assembly having a vertical dimension H2 slightly larger than L1 but smaller than L2 and a horizontal dimension W slightly larger than D but smaller than L1;

whereby the pipe hanger can be assembled with the mounting rod in any orientation in which the first end of the rod is aligned with the vertical dimension H2 of the apertures in the outermost arms of the assembly and with either arm of the yoke engaging either arm of the saddle, and the weight of the saddle will maintain the pipe hanger in assembled condition and preclude inadvertent withdrawal of the mounting rod.

2. A pipe hanger, according to claim 1, wherein the apertures in the innermost arms are generally circular in configuration.

3. A pipe hanger, according to claim 1, wherein the yoke arms comprise the innermost arms of the yoke-saddle assembly and the saddle arms comprise the outermost arms.

* * * * *